Figure 1:
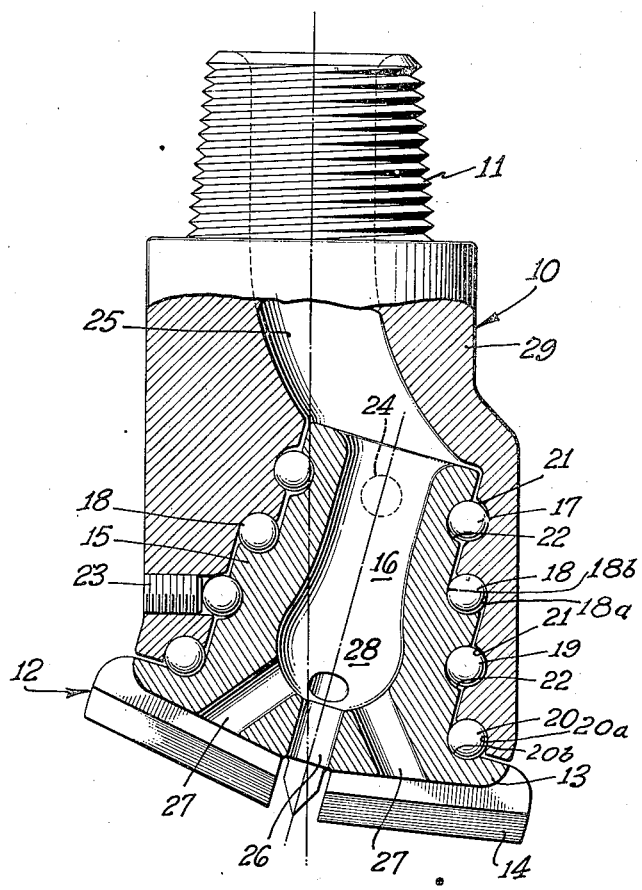

Dec. 7, 1943.  J. A. ZUBLIN  2,336,337
HEAVY DUTY GYRATING BIT
Filed Aug. 13, 1942

JOHN A. ZUBLIN,
INVENTOR.

BY James T Bethell

Patented Dec. 7, 1943

2,336,337

UNITED STATES PATENT OFFICE 2,336,337

HEAVY DUTY GYRATING BIT

John A. Zublin, Los Angeles, Calif.

Application August 13, 1942, Serial No. 454,693

1 Claim. (Cl. 255—71)

This invention relates to drilling bits, and more particularly to drilling bits of the type including a single cutter mounted for rotation on a shank at an angle to the axis of the bore being produced.

Bits of this type, often called "gyratory," transmit the entire weight imposed eccentrically on the bit to the cutter by means of bearings to permit rotation of the cutter with respect to the shank. The load imposed upon such bearings is very great, and is particularly difficult to successfully resist because of the complicated nature of the load which the peculiar action of the bit imposes upon the bearings. The load can be considered as a thrust, but there are radial components of considerable magnitude. Inasmuch as the thrust is applied by the teeth which are in contact with the bottom of the formation, it can be seen that there will be a greater upward thrust on the portion of the bearing immediately above the teeth which are in contact with the formation than in other portions of the bearing. One method of taking care of this type of load is shown in my prior Patent No. 2,227,209. In that patent there is shown a bit which has a mushroom shaped cutter, the head of which forms the tooth carrying body of the cutter, and the stem of which is rotatably mounted on the shank of the bit. A thrust bearing is also shown between the tooth carrying head of the bit and the shank. It can be seen that the constant wearing of the bearings, due to the high loads and the abrasive action of the fluid in which the bit must operate eventually tends to destroy the original machined fit between the cutter and the shank, and more particularly would tend to wear away the portion of the races on the shank which are subjected to the greatest load; i. e., the portion of the race which is directly above the portion of the cutter in contact with the hole bottom since the balls in the bearings also wear down. Such wearing away of the races and rolling element will eventually result in a loosening of the cutter on the shank to such an extent that the thrust bearing between the shank and the cutter head might tend to open above the teeth which are not in contact with the formation. This might result in the balls of the bearing being lost, leaving them in the hole, thus causing great damage to the teeth of the cutter as the bit continues to rotate.

If a bearing is provided of the general type above described; i. e., a bearing between the body of the bit and shank, and two or more bearings between the stem of the cutter and bore in the shank, it will be appreciated that the load tending to move the cutter upwardly and tending to cant the cutter will load the bearings which are uppermost on the cutter stem to a lesser degree than the bearings which are adjacent the bottom of the stem. At the same time, the bending stresses and strains tending to break the body of the cutter loose from the stem will be much greater at the junction of the head of the stem than at a point higher up on the stem. Because as a general rule oil well tools are operated in such a manner that the parts are very highly stressed, it becomes important to so proportion the bit and the parts that this region of the stem closely adjacent the head of the cutter be of sufficient strength to withstand such forces tending to break the cutter.

It thus becomes the general object of this invention to provide an improved bearing structure for rotatably securing the cutter to the shank.

It is a further object of this invention to provide a bearing structure which will not tend to lose its rolling elements upon wearing of the parts.

It is a further object of this invention to provide a means for successfully resisting the eccentric thrust load imposed by a cutter on a bearing between it and the shank.

It is a further object of the present invention to provide a cutter and shank which will not be subjected to localized stress tending to break or crystallize the material of which the cutter is made.

It is a further object of the present invention to provide a shank and cutter assembly involving multiple bearings in which the size of each bearing is properly related to the load which the bearing must resist.

Cutters of the general type illustrated in the above mentioned patent generally have a hollow stem down which drilling fluid passes to openings which lead to the exterior of the cutter. The velocity of the drilling fluid passing through the hollow stem is sufficient to cause a washing action tending to erode the nozzles or circulation holes. This erosion is particularly noticeable in the entrance mouth of the circulation holes.

It is therefore a further object of the present invention to provide a means for minimizing the erosive action of the drilling fluid on the circulation openings.

At the same time it is important to be able to provide circulation openings which will most effectively distribute the drilling fluid over the entire bottom of the bore and which will tend to wash the cutting teeth.

It is therefore a further object of the present invention to produce a cutter having circulation openings which are arranged to most effectively clean the bottom of the bore and the teeth of the cutter.

Referring now to the drawing:

Figure 1 is a section taken through the center of one form of bit embodying the present invention.

The bit shown comprises a shank member 10 which is provided at its upper end with a threaded pin 11 for attachment to the drilling string. A cutter member 12 is mounted on the shank 11 for rotation about an axis which is inclined with respect to the axis of the shank.

The cutter comprises a head 13 which carries teeth 14 for action upon the formation. These teeth may be of any configuration desired as they do not comprise a part of the present invention. It can be seen that the rotation of the shank 10 will cause the teeth to engage the formation with a gyratory motion which will cut the formation. As is shown in the drawing, there is a relatively small difference in diameter between the head 13 and the lowermost portion of the stem 15 of the cutter. As the bending stress exerted on the cutter stem is greater near the head of the cutter than at the upper portion of the stem, it is desirable to form the stem to offer the greatest resistance to bending near the head, while the upper portion of the stem can be made with less resistance to bending. For this reason the exterior of the stem and the watercourse are arranged to give the stem a gradually decreasing cross section, and a gradually decreasing moment of inertia from the bottom to the uppermost portion of the stem. This also permits the watercourse to take a different configuration from that usually found in cutters of this type. As shown in the figure, the watercourse is of a greater cross section in the lowermost portion than it is in its upper portion. This serves another purpose as will be made clear hereinafter. For the present, however, it is pointed out that this shape of watercourse taken with the shape of the exterior of the cutter stem enables the most efficient utilization of the material of which the cutter and stem are made.

The bearings by which the cutter is secured to the shank form an important part of this invention. It will be noted that there are four rows of balls running in races. These balls are so arranged that the bearing formed by the balls 17 running in their races is of the smallest diameter, and the bearings formed at 18, 19 and 20 are of increased diameter. Thus, although the balls are all of the same diameter, the increase in diameter of the bearings enables the lowermost row of balls to carry a proportionately greater load than will the uppermost balls 17. This is in accordance with the loads imposed upon the bearings by the cutter head and cutter stem.

It is convenient to utilize bearings in which the balls are all of the same size, so that there can be no mistake in assembling the bit in the field when changing the cutter. The lowermost bearing is formed to be a combination thrust and radial bearing, by the formation of the race 20a in the shank and the race 20b in the cutter. It will be noted that this bearing can withstand upward thrusts on the cutter and radial loads, but is incapable of holding the cutter against downward movement. The bearing formed at 18 has races 18a and 18b of the same type.

When the cutter is off bottom its weight and the internal water pressure tend to force it off the shank. In addition to this, when pulling the bit from the hole, considerable force tending to force the bit off the shank is exerted by the engagement of the teeth of the cutter on mud caked around the walls of the hole.

For this reason, the bearings at 17 and 19 are made as shown. They are essentially radial bearings, but it will be noted that they differ in an important manner from conventional radial bearings. A clearance 21 is provided at the top of the race on the shank, and a clearance 22 is provided below the race in the cutter. The bearings 17 and 19 are therefore incapable of withstanding any upward thrust of the cutter, which function is reserved to the bearings 18 and 20. These bearings 17 and 19 are, however, capable of resisting any load tending to force the cutter off the bit.

The action of the bearings 17, 18, 19 and 20 should now be clear. When the bit is new, it has the clearance 21 and 22. The radial load, caused by the action of the bit in the hole, is taken by all of the bearings 17, 18, 19 and 20. Bearings 17 and 19 are particularly suited to this service, as they are freed from any thrust load. Continued running of the bit will wear bearings, and, as bearings 18 and 20 wear, the cutter will travel upwardly. The radial bearings 17 and 19 permit this because of clearances 21 and 22. This wear can continue until the cutter has moved upwardly a distance equal to the sum of the clearances 21 and 22. When the bit is worn to that extent, there will be an imposition of a load tending to shear the balls in bearings 17 and 19. The bit should then be removed from the bore. The bearings 17 and 19 will still prevent the cutter from leaving the shank.

As, after considerable wear, the cutter is not held against canting as efficiently as when the bit is new, the balls to the left in bearings 17 and 19 will prevent canting of the cutter an amount sufficient to cause the balls at 20 to drop out into the well bore.

It will be noted the bearings 18 and 20 can be inserted by simply dropping the balls in place before the cutter is inserted in the shank. On the other hand the bearings 17 and 19 must be provided with some means to permit their insertion as the cutter is assembled on the bit shank. For this reason the plug 23 is provided for the bearing 19 and a similar plug 24 is provided for the bearing 17. The device is simply assembled without the balls in the bearings 17 and 19. The balls are then inserted through the openings filled with the plugs 23 and 24. The device is then ready for operation.

Mention was made before of the fact that the water course 16 and the outside surface of the cutter were formed to correctly proportion the stem of the cutter. In addition to this, the watercourse takes the shape shown for another reason. As drilling fluid is driven down the watercourse 25 in the bit shank to the comparatively narrow neck of the watercourse 16, it will attain a considerable velocity. If it is permitted to strike the mouths of the nozzles or circulation openings 26, 27 with this velocity, it will seriously wash or erode the nozzle in a comparatively short period of time, especially if high abrasive formations are drilled which will result in the inevitable inclusion of a certain amount of abrasive material in the drilling fluid. For this reason the passage 16 widens at its lowermost portion 28, which slows down the fluid to such an extent that it will not damage the circulation openings 26, 27. It will be understood, of course, that the nozzles may be cylindrical or tapered if desired and of a diameter and number suitable to give the stream issuing therefrom the necessary velocity under the available pressure. With regard to these nozzles, a single central opening has been shown, with two of the side openings 27. The more or less spherical shape of the widened portion 28 of the watercourse 16 enables the correct distribution of the fluid to the side openings and to the center opening without undue eddying or sudden changes of direction, which would tend to promote the erosive action of the fluid on the interior of the cutter and on the mouths of the openings.

I claim:

In a shank and cutter assembly for gyratory bits, an inclined bore in the shank, said bore being stepped up in inside diameter from the upper end to the lower end thereof, a stem on the cutter extending upwardly into said bore, said stem being stepped down in outside diameter from the lower end to the upper end thereof, a plurality of annular grooves in the wall of said bore, complementary annular grooves on the surface of said stem, said grooves cooperating to form a plurality of axially spaced generally toric ball races of diameters which decrease progressively from the lower end of said stem to the upper end thereof, and balls in said races forming antifriction bearing means between said stem and said bore, the annular grooves of alternate bearing means including the lowermost of said bearing means being opposed in a manner to resist radial loads and upward thrust only imposed by the cutter and the annular grooves of intermediate bearing means being opposed in a manner to resist radial loads and downward thrust only imposed by said cutter, whereby said stem is retained in operative position in said bore solely by the balls of said bearing means.

JOHN A. ZUBLIN.